United States Patent
Richard et al.

(10) Patent No.: US 9,424,088 B1
(45) Date of Patent: Aug. 23, 2016

(54) MULTI-LEVEL DEFICIT WEIGHTED ROUND ROBIN SCHEDULER ACTING AS A FLAT SINGLE SCHEDULER

(71) Applicant: Altera Corporation, San Jose, CA (US)

(72) Inventors: Frederic Richard, Maidenhead (GB); David W. Mendel, San Jose, CA (US)

(73) Assignee: Altera Corporation, San Jose, CA (US)

( * ) Notice: Subject to any disclaimer, the term of this patent is extended or adjusted under 35 U.S.C. 154(b) by 287 days.

(21) Appl. No.: 13/662,323

(22) Filed: Oct. 26, 2012

(51) Int. Cl.
*G06F 9/50* (2006.01)
*H04L 12/861* (2013.01)
*G06F 9/48* (2006.01)

(52) U.S. Cl.
CPC ............ *G06F 9/5011* (2013.01); *G06F 9/4881* (2013.01); *H04L 49/90* (2013.01)

(58) Field of Classification Search
CPC .................................................... G06F 9/4881
USPC ........................................................ 718/103
See application file for complete search history.

(56) References Cited

U.S. PATENT DOCUMENTS

| | | | |
|---|---|---|---|
| 6,452,933 B1* | 9/2002 | Duffield et al. | 370/415 |
| 2006/0245443 A1* | 11/2006 | Basso et al. | 370/412 |
| 2007/0104210 A1* | 5/2007 | Wu et al. | 370/412 |
| 2010/0278190 A1* | 11/2010 | Yip et al. | 370/412 |
| 2012/0020370 A1* | 1/2012 | Sonnier et al. | 370/412 |
| 2012/0134371 A1* | 5/2012 | Yang et al. | 370/412 |
| 2013/0058211 A1* | 3/2013 | Racz et al. | 370/229 |
| 2014/0068076 A1* | 3/2014 | Dasher et al. | 709/226 |

* cited by examiner

*Primary Examiner* — Emerson Puente
*Assistant Examiner* — Charlie Sun
(74) *Attorney, Agent, or Firm* — Fletcher Yoder, P.C.

(57) ABSTRACT

Various embodiments of the present disclosure provide techniques and mechanisms for providing a fast multi-level scheduler, implemented using a plurality of smaller schedulers, the plurality of smaller schedulers together performing the functions of a single conventional scheduler.

17 Claims, 7 Drawing Sheets

MULTI-LEVEL DEFICIT WEIGHTED ROUND ROBIN SCHEDULER ACTING AS A FLAT SINGLE SCHEDULER

FIELD OF THE INVENTION

The present disclosure relates generally to computer networking, and, more particularly, to techniques and mechanisms for scheduling.

BACKGROUND

Modern computer networks frequently face the challenge of needing to share a single resource among multiple entities. One example of this is switching data traffic in a switch that is part of a computer network. In such a network switch, data traffic received from a plurality of input ports may need to be sent out through a particular output port. Directing such flows of traffic raises challenges such as determining which port goes next, and how much the port may send, etc. Such tasks are often performed by a scheduler. Scheduling may also involve taking Quality of Service considerations into account for different flows. Priority scheduling can involve considering a fair distribution of bandwidth resources as well as considering QoS guarantees. Changing weights can be used to implement priority scheduling.

A variety of scheduling algorithms have been developed to assist with the process of routing data traffic within a switch. Unfortunately, many of the algorithms can take a long time to compute. The longer computation time can slow down processing speeds. For example, if a computation takes more than one clock cycle to complete, the opportunity to send data traffic through the output port for one or more clock cycles can be lost. This result may not be acceptable in high performance networks with a large throughput. To avoid this result, the entire switch system may be designed to operate at a slower frequency to insure that a selection of a next flow for transmission can always occur within one clock cycle. But having a slower device speed is also undesirable, and frequently unacceptable, in high performance networks.

Accordingly, various embodiments of the present application seek to improve upon mechanisms and techniques for implementing schedulers to address these and other related challenges that arise when a number of entities seek access to a single shared resource.

SUMMARY OF THE INVENTION

Particular embodiments of the present invention improve upon systems for scheduling access by a number of competing entities to a single shared resource.

In one embodiment, a process for deficit round robin scheduling in a switching environment using a multi-level hierarchical scheduler is provided. In some embodiments, the process uses a plurality of sub schedulers arranged in a hierarchy, to create the multi-level scheduler, the plurality of sub schedulers together performing the functions of a single flat scheduler. Subgroups are created from a group of entities desiring access to a shared resource. Each subgroup of entities is assigned to a sub scheduler of a plurality of sub schedulers at a first level of the multi-level scheduler. Each first level sub scheduler determines a first level result entity from among its assigned subgroup to access the shared resource next. Outputs of the first level sub schedulers are sent as inputs to a second level sub scheduler, the second level sub scheduler selecting from among the inputs it receives from the first level sub schedulers to determine a second level result entity to access the shared resource next. In some embodiments, the entities may be users, flows, or input ports or other devices.

BRIEF DESCRIPTION OF THE DRAWINGS

Techniques and mechanisms are provided for an improved scheduler that uses a plurality of smaller schedulers arranged in a multi-level hierarchy to schedule access to a shared resource.

The above techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

DETAILED DESCRIPTION OF EXAMPLE EMBODIMENTS

Figure 1:
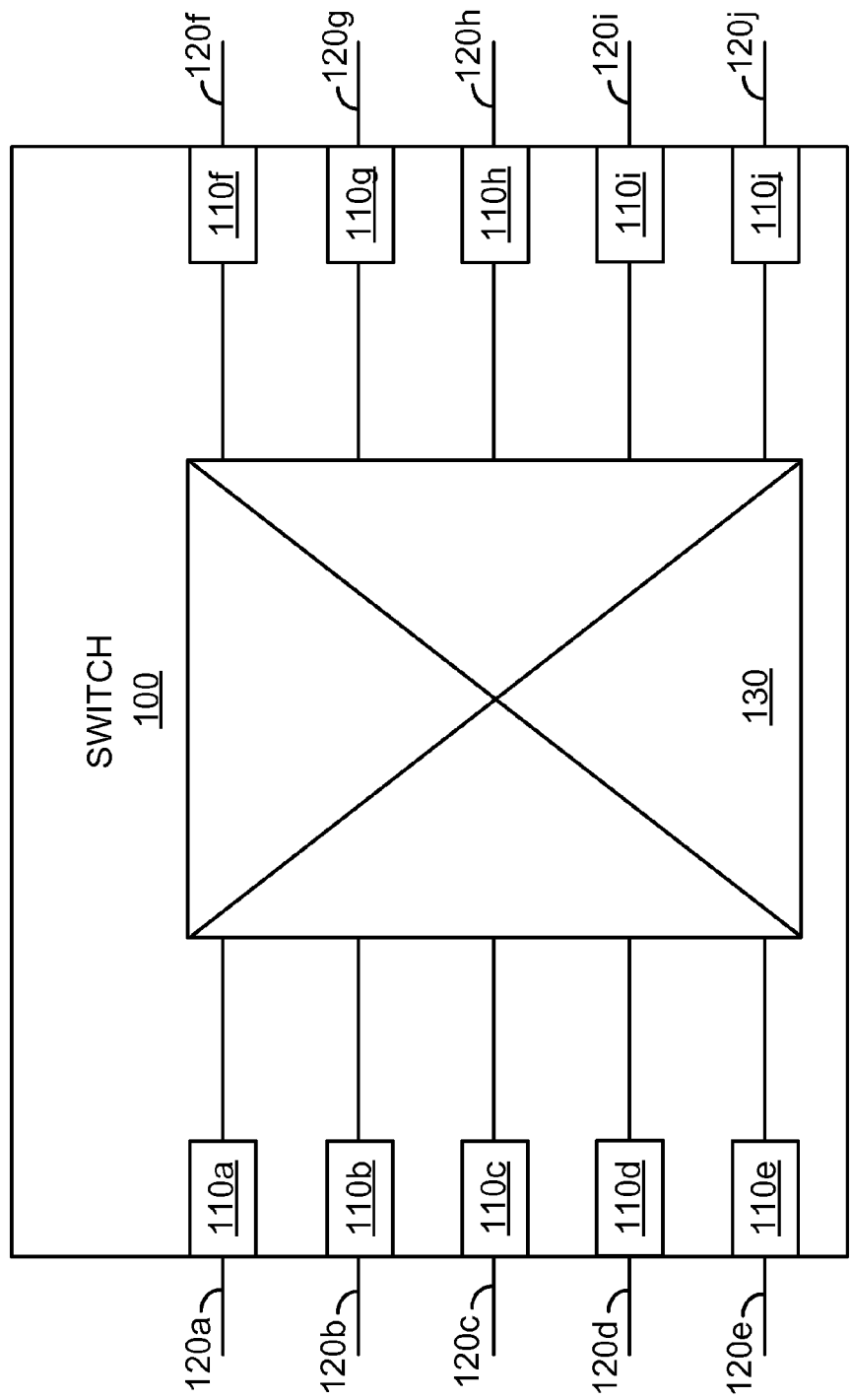
FIG. 1 illustrates an example computer network.

Various embodiments of the present disclosure provide techniques and mechanisms for a multi-level scheduler using a plurality of smaller sub schedulers arranged in a hierarchy.

Improvements in performance are achieved in part by breaking down a group of entities desiring access to a shared resource into subgroups. Each subgroup is then assigned to a scheduler at a first level of the multi-level scheduler, where the first level schedulers determines an entity from among the members of its assigned subgroup that should use the shared resource next. The outputs of the first level of schedulers are then sent as inputs to a second level scheduler or schedulers. The second level schedulers then select from among their assigned inputs to determine an entity to use the shared resource next.

Such a multi-level scheduler may be implemented on non-programmable devices such as Application Specific Integrated Circuits (ASICs) and Application Specific Standard Products (ASSPs), as well as on programmable devices such as Programmable Logic Devices (PLDs) and Field Programmable Gate Arrays (FPGAs).

The calculations which a scheduler performs in determining which of a plurality of entities may next use a shared resource next can be time intensive. Often, the circuitry performing the calculations required for a scheduler can represent the critical path in a device with which the scheduler is associated.

One factor that frequently informs the length of time it takes to perform a particular calculation is the number of users or requests which the shared resource must service. Frequently, the length of time needed to perform the calculation increases with the number of users or requests. As computer networks become more sophisticated and handle more users and applications, the number of users or requests for a single shared resource is likely to only increase.

Embodiments of the present application can be particularly useful in the context of devices with slower processing speeds in general, such as programmable logic devices. However, it will be understood that embodiments of the present invention are not intended to be restricted to programmable logic devices but may apply to a variety of devices which operate in systems where a resource is being shared by a plurality of entities.

For example, as noted above, in high performance systems, scheduling can become one of the bottlenecks in a computer network. For example, where there is a need to schedule a large number of packets in a short time frame, for example, 300 million packets per second (Mpps) for a 200 gigabits per second (Gbps) link, the switch may not be able to send all of the input data traffic out of the output port in a timely manner. This can lead to packet drops and network inefficiencies. For example, in the best case, a conventional scheduler will schedule one packet per clock cycle. Depending on the speed of the circuit on which the scheduler is built, however, the scheduler may have to run at 300 MHz or slower to achieve this goal of scheduling of one packet per clock cycle. For many networks, such slow processing speeds are, or will soon become, unacceptable.

As networks continue to evolve, the ratio of users or entities seeking to access a same shared resource will likely only increase. As the number of inputs increases, the time required to perform scheduling may more and more often become the critical timing path for a device that requires scheduling, as system speeds continue to increase, and ever more sophisticated network devices and uses are developed.

Whatever the scheduling algorithm used, the larger the number of inputs to the scheduler generally the longer the time required for the scheduler to compute the scheduling algorithm. That is, it is harder to get a scheduler with many inputs (e.g., 16) to run very fast. Running a scheduler with a smaller number of inputs very fast (e.g., 4) is easier. This time demand can be particularly problematic in situations where a large number of users are trying to access the same shared resource, and so the resource is oversubscribed, but available bandwidth is not being fully utilized due to the time constraints of scheduling.

One widely used technique for scheduling packets for transmission out of an output port of a switch involves use of a scheduling scheme referred to as deficit round robin.

Typically, deficit round-robin scheduling is not scalable to forward packets at full line rate when used for high-speed ports with large numbers of queues. The main reason is that this technique can result in time gaps during which packets do not get forwarded. As a result, the switch/router port can end up sending fewer packets than could be supported by the full line rate in situations with high speed ports with a large number of queues. This is one example of how scheduling can become a time critical task in a system with a large number of inputs or users.

Figure 2:
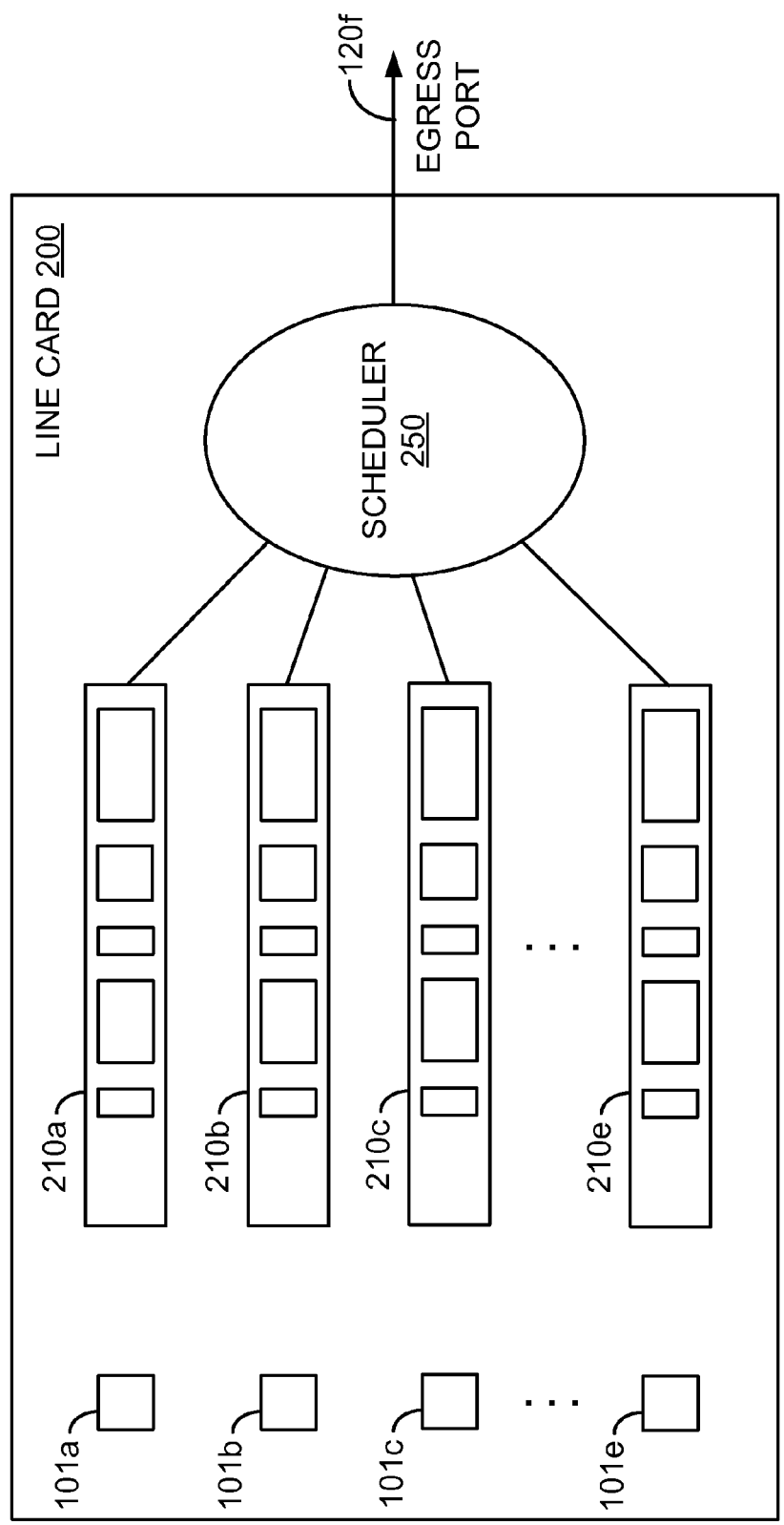
FIG. 2 illustrates an example switch of a computer network, the switch having a scheduler.

FIG. 1 illustrates an example switch 100 of a computer network. FIG. 2 illustrates an example line card 200 of the switch 100, the line card 200 having a scheduler 250. It will be understood that the location of the scheduler on a line card of the switch is provided for purposes of illustration, and that different configurations of the switch and the scheduler could be used.

Illustrated in FIG. 1 is an embodiment of a switch 100 having a number of ports, including ports 110*a*, 210*b*, . . . , 210*j*, as shown in FIG. 1. Associated with each of the ports 110*a-j* is a set of queues (i.e., port 110*a* is associated with queues 210*a*, port 110*b* is associated with queues 220*b*, and so on). The queues 210 are shown in FIG. 2 Each of the switch ports 110*a-n* may be coupled with a node (or nodes) via a corresponding link 120 (i.e., port 110*a* is coupled with a node via link 120*a*, and so on). The nodes to which the ports 110 are connected may comprise any addressable device. For example, a node 110 may comprise a computer system or other computing device-such as a server, a desktop computer, a laptop computer, or a hand-held computing device (e.g., a personal digital assistant or PDA)—or a node 110 may comprise another switch coupled with other nodes (e.g., a separate sub-network of nodes). Each of the links 120*a-n* may be established over any suitable medium—e.g., wireless, copper wire, fiber optic, or a combination thereof-using any suitable protocol—e.g., TCP/IP (Transmission Control Protocol/Internet Protocol), HTTP (Hyper-Text Transmission Protocol), among others.

Although the detailed embodiments described in this application relate to switching devices, it will be understood that the disclosed improvements may be implemented on any device that routes, generates, forwards, or otherwise directs communications between two or more devices (e.g., communications between two nodes interconnected by a computer network, or communications between two devices interconnected by a high speed backplane fabric, etc.). Further although embodiments of the present application provide a scheduler that can act as a single flat DWRR scheduler, in other embodiments, the scheduler can act as a single scheduler that is not a DWRR scheduler as well.

A typical switch 100 has multiple ports 110*a-j* sending and receiving data packets. Usually a data packet enters a switch from one port and departs from another port. In some embodiments, the switch ports can each receive and forward data packet simultaneously.

Switch 100 includes switch fabric 130. The switch fabric is shown as having a cross bar configuration in FIG. 1, but it will be understood that any mechanism by which data is transferred from input ports to output ports may be used in place of the switch fabric 130 shown in FIG. 1. In one example, data packets arrive at the left hand side switch ports 110*a-e* (i.e., ingress ports) and are provided to corresponding line cards, for example the line card pictured in FIG. 2. The data packets are then processed by switch fabric 130, and then depart from the right hand side ports 110*f-j* (i.e., egress ports). which may also be associated with line cards such as line card 200.

The line card 200 includes multiple queues 210*a-e* and ports 110*a-e*. Line card 200 includes queues 210*a-e* for storing data packets received from ingress ports 110*a-e*. It also includes scheduler 250. Each of queues 210*a-e* is controlled by scheduler 250. Based on QoS requirements and other considerations, scheduler 250 selects one of queues 210*a-e* to send data packets over the egress port 120*f*.

For example, in the context of a switch 100, ports 110*a-e* may each be contending to send packets to port 110*f*. Each packet may represent a demand made by a user on the resource which in this example is the "output port". Typically, an output port or other shared resource server can serve only one request at any given time so all other requests for service (for example, packets requiring transmission out of one egress port), must wait. Those other packets (or requests for service) frequently are stored in one or more queues until their turn for using the shared resource comes up. As requests for service accumulate in queues, scheduler 250 applies a scheduling algorithm to decide which request to service next.

In one embodiment, the switch 100 comprises any suitable computing device, and the packet scheduler 250 comprises a software application that may be implemented or executed on this computing device.

Figure 3A:
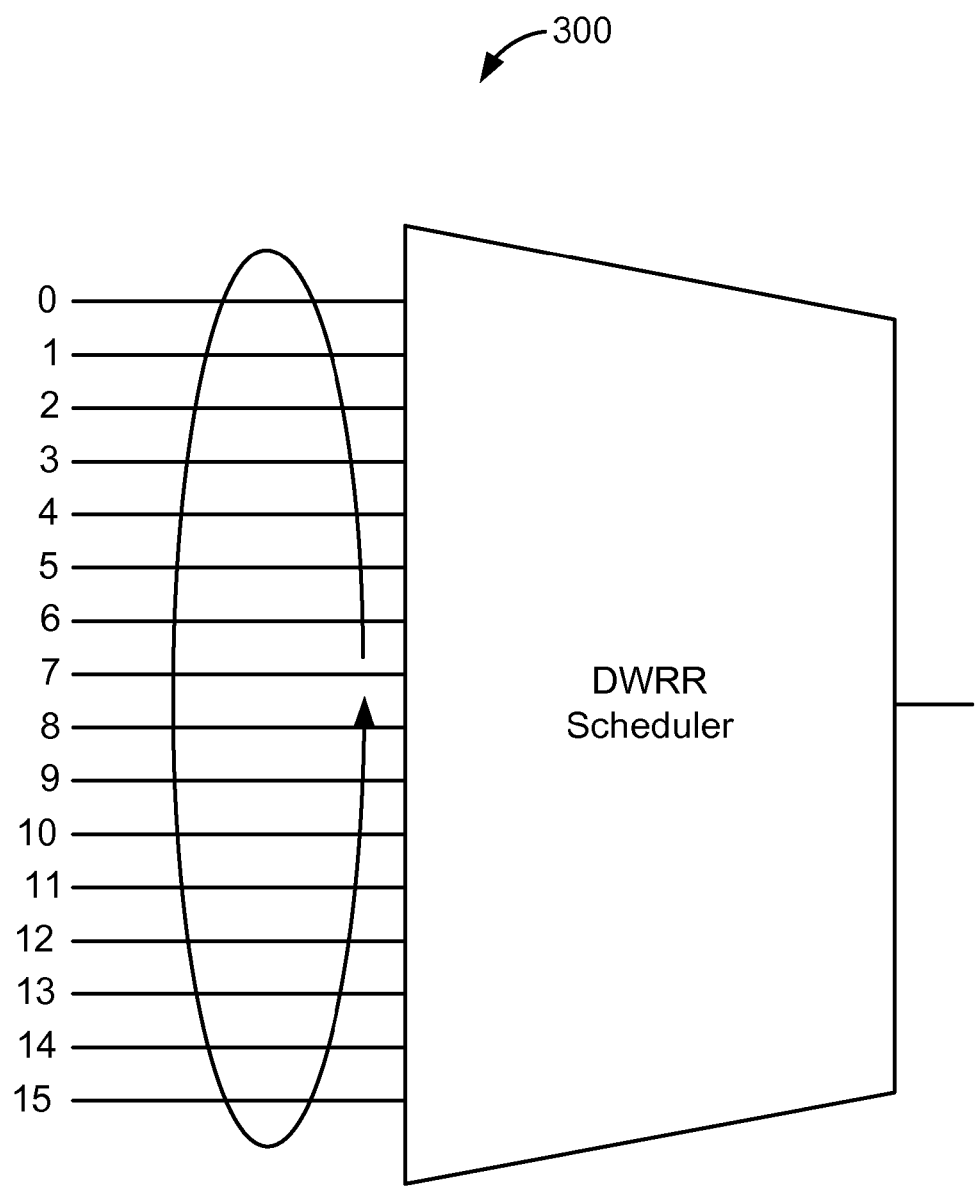
FIG. 3A illustrates an example of a single level scheduler.
Figure 3B:
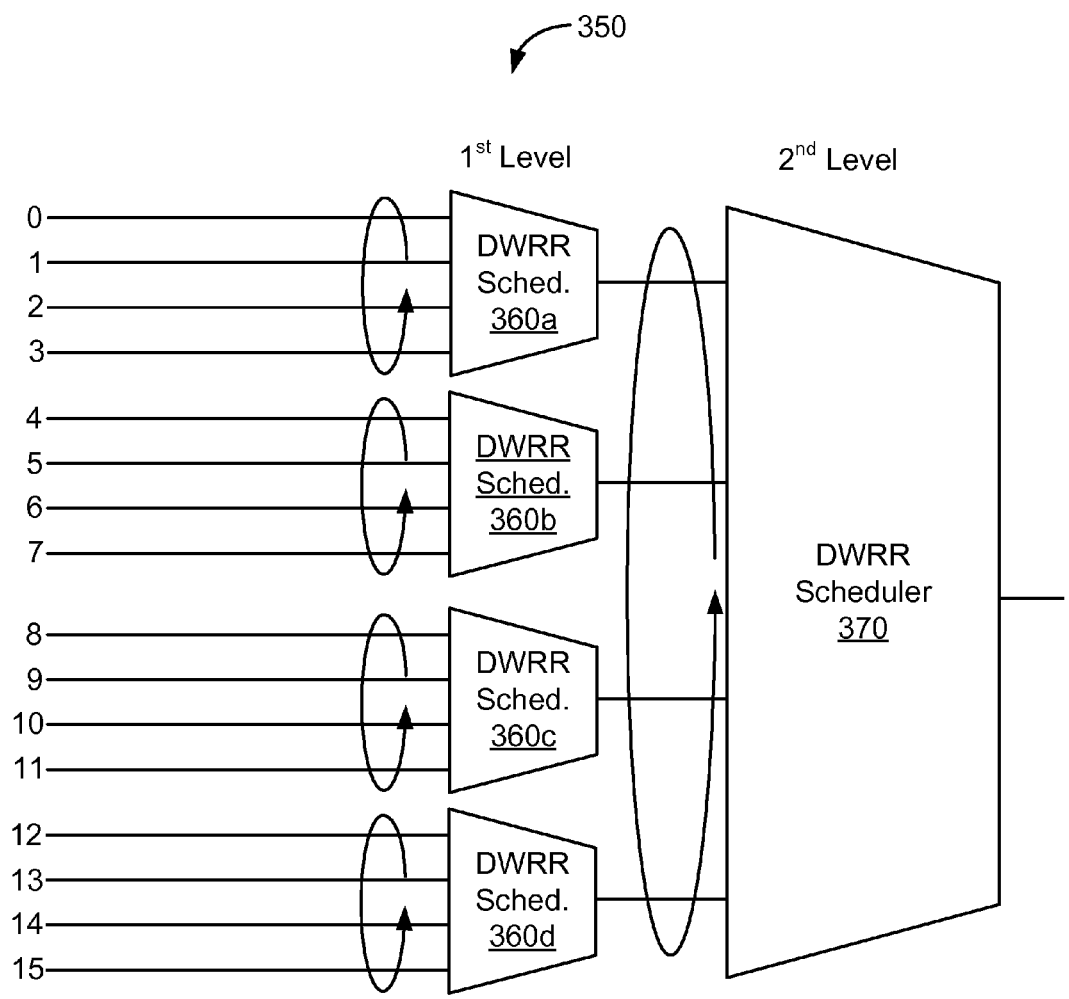
FIG. 3B illustrates an example illustration of a multi-level Deficit Weighted Round Robin scheduler according to one embodiment of the present application.

FIG. 3A illustrates an example illustration of a plurality of inputs flowing into a single level scheduler. As shown in FIG. 3A, there are sixteen input flows which the scheduler 300 needs to schedule. FIG. 3A depicts these flows using the numbers 0, 1, 2, . . . 15, for ease of reference. FIG. 3B illustrates an example illustration of the same sixteen inputs flowing into a multi-level hierarchical Deficit Weighted Round Robin scheduler 350 according to one embodiment of the present application;

As shown in FIG. 3B, according to one embodiment of the present application, instead of having a many input (e.g. 16 input) device feeding a single Deficit Weighted Round Robin (DWRR) scheduler, a hierarchy of two or more layers of smaller schedulers may be created. For example, each block of <n>inputs (e.g. 4 inputs) may feed a different smaller DWRR scheduler, and the results of those small DWRRs may be fed into one or more DWRR scheduler at a next layer of DWRR schedulers.

As shown in FIG. 3B, a sub schedulers 360a-d and 370 are ordered in a hierarchical manner to form a multi-level scheduler 350, are used in place of the single flat scheduler 300 shown in FIG. 3A. The inventors found it was possible to use a set of smaller schedulers in a hierarchical fashion to produce better results than a single scheduler. The multi-level scheduler provides improved processing speeds and/or performance over the flat conventional scheduler.

That is, according to one embodiment of the present disclosure, a hierarchy of smaller DWRR schedulers is used to mimic the behavior of a single flat scheduler 300. Among other things, the use of a group of smaller schedulers to replace a single large scheduler provides the benefit of reducing the number of inputs that a scheduling algorithm needs to factor into its calculations. Further, while the use of a group of schedulers in place of a single scheduler does incur some additional propagation delay in terms of the transmission of signals between different levels of schedulers, because the scheduling is spread over a plurality of schedulers, more of it can be pipelined, ultimately resulting in a faster process. The inventors found that the system was able to achieve processing speeds far faster than what was achieved with a conventional flat scheduler where the scheduler was scheduling a large number of inputs.

The inventors found using a multi-level scheduler does pose some new challenges, as discussed further below. They found some of these issues could be addressed by employing Deficit Weighted Round Robin in the hierarchical scheduler. As discussed further below, the inventors used a Deficit Weighted Round Robin scheme in the hierarchical scheduler 350 to provide results that more closely approximate those of a single flat scheduler 300.

Various queuing and scheduling algorithms may be implemented on switch 100 to meet various QoS requirements and other networking goals and policies. The simplest is the First-In-First-Out (FIFO) scheme where packets are stored in one queue and sent out in the same order as they are received. The FIFO scheme does not insure that bandwidth is distributed fairly among all of the traffic flows, however, and may result in a few flows monopolizing most of the bandwidth. To address this problem, a per-flow queue based scheduling algorithm, referred to as round-robin (RR) scheduling, is applied in various embodiments of the present application.

In round-robin scheduling, traffic from different flows are queued separately in their own queues and the switch/router port scheduler consecutively and cyclically "visits" all the packet queues, and sends at least one packet from each queue during the visit. The round robin scheme produces a fairer distribution of numbers of packets among different flows because each flow can be guaranteed the opportunity to send a packet in each round-robin scheduling cycle.

However, round-robin scheduling runs into the problem of different packet sizes. Round robin schemes cannot distinguish large packets and small packets. Packet sizes can vary in a network. Some flows may send a packet ten times larger than packets sent by other flows; the larger packet size flows would enjoy an unfair advantage in terms of amount of data they were allowed to send—e.g., they may use in the above example ten times more bandwidth than the other flows.

In addition in real network environments, different flows can have different QoS and thus different bandwidth requirements and should not be treated as equal by a scheduler.

The inventors found, with respect to a fair allocation of bandwidth, that additional complexity arises in the context of a multi-level system such as theirs which uses a hierarchy of smaller schedulers. For example, if one or more of the traffic flows becomes inactive, it is desirable to distribute the bandwidth of those inactive flows across the remaining active flows. However, with a scheme involving a hierarchy of schedulers at multiple levels, allocation of unused bandwidth is a somewhat more complex process. In some embodiments, a weighting process may be needed to insure a fair distribution of bandwidth.

Further, the weighting will also need to take account of any priority weighting already being applied to various flows. For example, if a particular flow is supposed to receive 3× the bandwidth of the other flows; once a multi-level hierarchy for a scheduler is implemented, it is necessary to insure that the priority scheme is carried across each level of the hierarchy.

A simple illustration will serve to demonstrate why weighting is useful in order to insure equal distribution of bandwidth among the ports. Such a result assists in multi-level scheduler 400 more closely approximating the performance of flat single level scheduler 300.

Let us assume there are sixteen 10 Gigabyte per second input flows, and there is a single 100 Gbps output port which all of those flows are trying to access. These numbers indicate a situation where the output port has a demand made of it of 160 Gbps and it can only service 100 Gbps. The output port is thus over-subscribed by up to 60%.

Assume that the system is one that does not involve QoS levels, but is only concerned with fair distribution of bandwidth. If all input ports have 100% usage (i.e., they are fully subscribed), then each input port should get 100/16% of the bandwidth (6.25%)

However, if port 0 and port 15 do not have any traffic, we have 40% oversubscription of the outport port's bandwidth, rather than 60%.

In a conventional systems without weighting, each remaining input ports would get 100/14% (7.14%). In a scheme involving hierarchical group of smaller schedulers comprising a single multi-level scheduler such as the one shown in FIG. 3B, if no weighting was applied, this would meant that ports 1,2, and 3 and ports 12,13, and 14 would get more bandwidth than ports 4-11. Specifically, each input of the $2^{nd}$ Level will be allocated ¼ of the bandwidth (25 Gbps) So $2^{nd}$ level DWRR scheduler will assign 25 Gbps of bandwidth to each of its input flows. But under this calculation, inputs 0 and 3 (corresponding to the top and bottom first level schedulers) would be given 30 Gpbs, while inputs 1 and 2 (corresponding to the middle two first level schedulers would be given 40 Gbps, so Ports 1,2, and 3 would get ⅓ of the 25 Gbps allocated to its corresponding scheduler as port 0 inactive (in other words, it would receive $1/12^{th}$ of the bandwidth, or 8.33%) Ports 4-7 (and 8-11) would get ¼ of the 25 Gbps allocated to their corresponding scheduler (or $1/16^{th}$ of the bandwidth, or 6.25%)

Accordingly, when applied without weighting, round robin leads to inequality between treatment of different ports. As a result, the multi-level scheduler 400 would not be able to achieve the same results as a single level DRR scheduler 300.

To resolve the above issues, different scheduling schemes were considered by the inventors. Weighting flows allows a system to insure a fairer distribution of bandwidth across all active flows. Accordingly, in various embodiments of the present application, each flow is given a weighting factor. One scheduling scheme used in various embodiments is the scheme referred to as Deficit Weighted Round-Robin (DWRR).

To execute the QoS scheme, the scheduler is required to distribute bandwidth to all the flows proportional to their weights. Each flow is allocated a certain amount of bandwidth credits per cycle, for example. In some embodiments, each flow is enabled to send packets at each visit of the scheduler depending on whether it has packets in its queue that require the same or fewer number of bytes than the number of credits remaining in its account.

Figure 4:
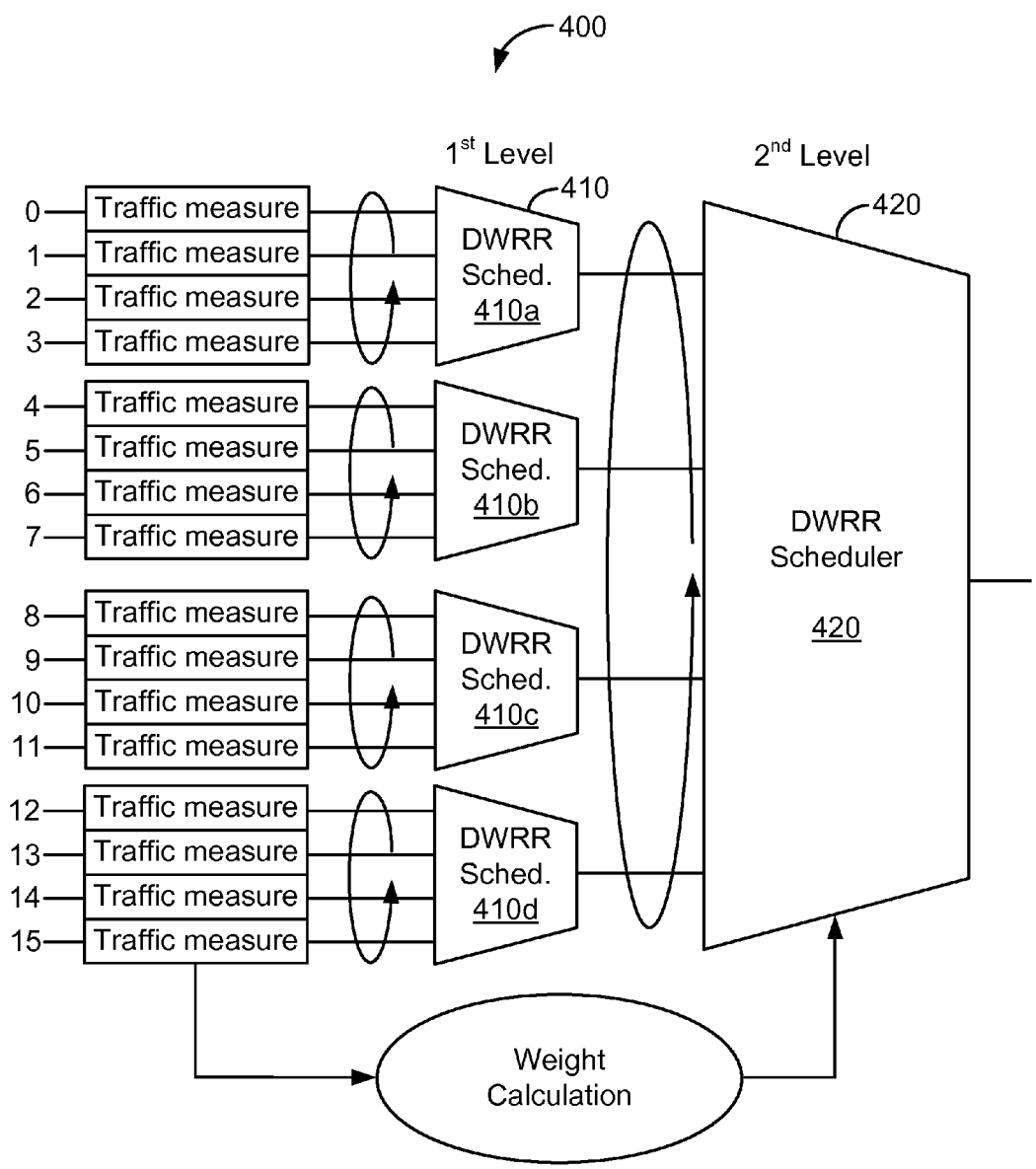
FIG. 4 illustrates an example illustration of a multi-level Deficit Weighted Round Robin scheduler where the volume of traffic on the input flows is monitored and reported to an allocation module which allocates available bandwidth across the input flows, according to one embodiment of the present application.

FIG. 4 illustrates an example illustration of input flows into a hierarchical multi-level scheduler 400 comprising a plurality of smaller Deficit Weighted Round Robin schedulers. In the multi-level scheduler 400 of FIG. 4, the volume of traffic going into the input ports 110*a*-3 for example is monitored and reported to an allocation module associated with a second level scheduler of the multi-level scheduler 400. According to one embodiment of the present application, the allocation module then allocates the available bandwidth of egress port 110*f* across the input ports 110*a*-*e*;

The dynamic use of weighting is deployed to balance the traffic being sent to the egress port 110*f* to achieve a fairer distribution of egress port 110*f*'s bandwidth among the input ports 110*a*-*e* contending for that bandwidth.

According to various embodiments of the present application, a weight is assigned to each of the inputs of a second layer DWRR 420 depending on the traffic load on that input stream. One simple illustration of such a weighting scheme is described below.

First, all of the inputs going to a first level scheduler 410 are added together, and the result is used to "normalise" the credits allocated to each input into second level DWRR scheduler 420. For example, the calculation can be conducted by putting a default weight of 100 on the second level DWRR scheduler. The amounts of all the traffic on the four channels on the input (value will range from 0 to 400) are added together and the sum is divided by four. If all channels are fully used, weight will remain at 100, otherwise for each input not experiencing full utilization, the input will be assigned a lower normalized number.

As an example, applying this normalization scheme to the flows described above yields the following result. For the second level we will have:

Input 0 and 3: weight of 300/4=75
Input 1 and 2: weight of 100

Total weights: 350, so input 0 and 3 will get $75/350$ or 21.4% of the bandwidth (in this case 21.4 Gbps), input 1 and 2 will get $100/350$ or 28.5% of the bandwidth (in this case 28.5 Gbps)

So ports 1-3 will get $1/3^{rd}$ of 21.4 Gbps, so 7.14% of the total bandwidth Ports 4-7 will get ¼ of 28.5 Gbps, so 7.14% too According to the above process, it is necessary to keep track of the traffic load on each of the inputs flowing into the scheduler, as depicted by the "Traffic measure" notations on FIG. 4. Accordingly, in one embodiment of the present disclosure, the traffic load on each port 110 of switch 100 is monitored in order to determine the total traffic load on each flow entering the second level scheduler 420. This and other information may be stored in a memory structure and accessed by the scheduler 250 at the time it schedules each transmission.

As noted above, FIG. 4 illustrates an example illustration of input flows and a multi-level Deficit Weighted Round Robin scheduler where the volume of traffic on the input flows is monitored and reported to an allocation module associated with the scheduler that allocates available bandwidth across the input flows. Dynamic use of weighting is deployed to balance the traffic.

Figure 5:
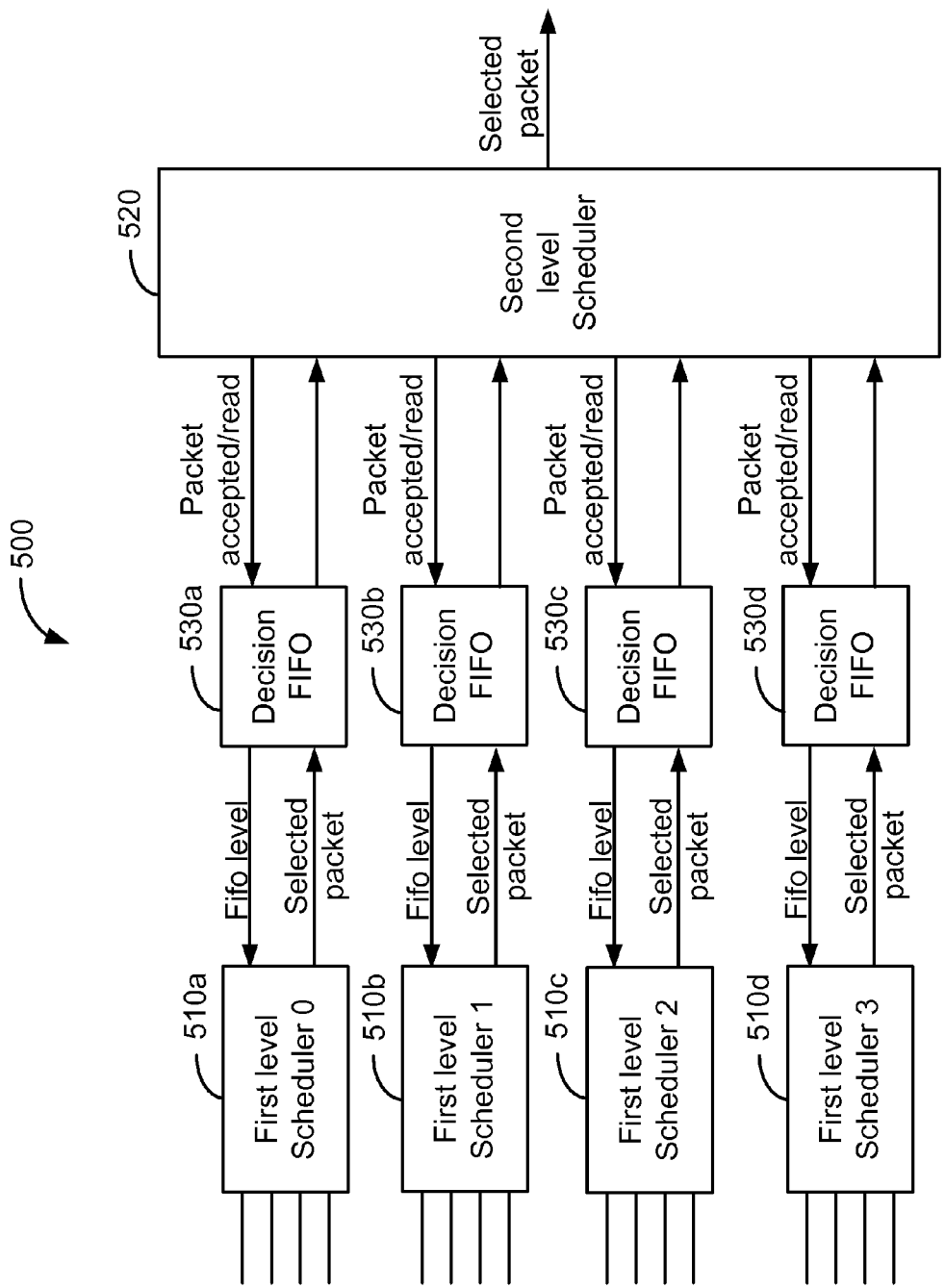
FIG. 5 shows an example illustration of various information that may be exchanged between the different sub-schedulers of the multi-level scheduler according to one embodiment of the present application.

Configuring a scheduler as a multi-level scheduler requires that some communication take place among the different levels of the hierarchy of the multilevel scheduler. FIG. 5 shows an example illustration of various information that may be exchanged between the different sub-schedulers of the multi-level scheduler according to one embodiment of the present application.

As shown in FIG. 5, the feedback may be in the form of reading/accepting a packet on a second level sub scheduler 520 of a multi-level scheduler. Receipt of such a read/accept signal by a first level scheduler 510*a*, for example, may trigger removal of the data indicated to be "read/accepted" from a FIFO of the first level sub scheduler 510*a*. FIFO levels can be monitored by the first level scheduler 510*a* and the first level sub scheduler 510*a* may stop scheduling more packets for transmission to place in the associated FIFO 530*a* once a pre-set fill level has been reached in FIFO 530, for example. This is discussed further below.

The feedback can take different forms. The feedback could be direct, where the second level sub scheduler 520 sends a direct message (read) to the first level sub scheduler 510*a*, indicating that that first level sub-scheduler can go ahead and schedule another packet for transmission to the second level sub scheduler 520.

The FIFOs would most likely reside next to the second level sub scheduler 520. The FIFO may be the entity which receives the Packet accepted/Read message, as shown in FIG. 5. Then the FIFO may generate a message to send to the relevant first level sub scheduler 510. The FIFO generated feedback message may be sent in the form of a level or a pause request from the FIFO to the first level sub scheduler.

Referring to FIG. 5, assume that the first level sub schedulers 510*a, b, c*, and *d*, are located on various devices, and the second level sub scheduler 520 is located on a different device. The decision FIFOs 530*a, b, c*, and *d*, store scheduled packets received from the first level sub schedulers. As noted above, the decision FIFOs 530*a, b, c*, and *d* might be located next to the second level sub scheduler 520, possibly on the same device as the second level sub scheduler 520.

Potentially, in some situations, a first level sub scheduler 510*a* may schedule more packets than will be consumed from an associated FIFO 530*a*. This will occur if the shared resource, for example, an output port of a switch, is being oversubscribed, for example. (If the resource is not oversubscribed then presumably all packets will be consumed.) In such a situation, the FIFO 530a may fill-up and may overflow, producing packet drops, unless a mechanism is included to address this situation.

According to one embodiment of the present application, in order to avoid such FIFO overflows, mechanisms are used to detect when the FIFO 530a reaches a predetermined level that corresponds with the FIFO 530a being at an almost full state. Once that almost full level is reached on the FIFO 530a, a communication may be sent to associated first level scheduler 510a that it should not schedule anymore packets for transmission to that FIFO 530a for the time being, for example.

The above monitoring, checking against the predetermined almost full threshold, and sending communications, takes time however. And while this is happening, the FIFO 530a is still receiving new packets to be scheduled. For example, once the FIFO prepares a message indicating it is almost full, this will take propagation-530a-510a (for example, 10 clock cycles) time to reach the first level sub scheduler 510a. Also, the sub scheduler 510 may already send some new packets, in essence the same number as the propagation-510a-530c (for example, 12 clock cycles), before it receives the message. This means between the FIFO 530a signaling its status and the FIFO not receiving more packets, 22 cycles will elapse, in this example.

According to one embodiment of the present application, the FIFO 530a is configured so that it sends a message stating that it is almost full while it is still able to receive 22 more entries into its queue, or in other words, the almost full value must be the size of the FIFO minus 22 locations on the FIFO minus probably a few more locations for a safety margin.

The disclosed embodiments described above relate to schedulers associated with network switches. However, it should be understood that the disclosed embodiments are not so limited in their scope, and, further, that the embodiments of a scheduler described in the following text and figures are generally applicable to any device, system, and/or circumstance where scheduling of data packets, requests or other data is needed.

Embodiments of the present application generally relate to a scheduler for managing any shared network resources of a computer network. For example, plurality of users may share numerous resources such as peripheral devices like printers, servers, routers, file systems, search engine servers and web site servers, among other things, over a computer network. In any situation where there is sharing of these resources over a computer network, the issue of contention for that resource arises, to which various embodiments of the present application may be applied.

Simulations have been run that confirm that the above described multi-level scheduler provides substantial benefits. In the simulation, different size packets were considered in order to insure that the system would work regardless of the size and type of packets which might be part of various flows.

Using a DWRR scheduler and configuring it to have a different number of input ports, it was found that sixteen port scheduler would runs at 215 MH, and a four port scheduler would run at 310 MHz.

As an example, in a multi-level scheduler having sixteen inputs and four sub schedulers at a first level, and a single sub scheduler at a second level, in one simulation, executing the scheme proposed above showed a 2× performance improvement as compared to a single conventional scheduler with sixteen inputs.

Particular embodiments of the present application provide one or more advantages. Particular embodiments provide a scheduler which can run at a higher rate. Particular embodiments provides for efficiencies in the design and configuration of the smaller schedulers 410 and 420 that make up the multi-level scheduler 400. In particular embodiments, any DWRR scheduler being used in the multi-level DWRR scheduler 400 can be used as either a first level scheduler or second level scheduler in the hierarchy of the multi-level DWRR scheduler 400. At each layer, the scheduling block is almost identical and has a similar structure/code as a standard DWRR scheduler, but, among other things, dynamic monitoring and weighting scheme are implemented to insure proper allocation of bandwidth across active flows. This enables efficiencies in code and test environment development, and also permits reuse.

Particular embodiments of the present application can be implemented in systems having a variable number of inputs because the multi-level hierarchical scheduler 400 can be configured such that it dynamically adjusts to changes in the number of inputs. While the embodiments discussed herein only involve the use of two levels of smaller sub schedulers, it will be understood that many more levels could be implemented. In particular embodiments, a scheduler might take in 64 input flows to be scheduled and handle them using a multi-level configuration of DWRR schedulers, each taking four inputs, in the following order: sixteen smaller schedulers in a first layer, four smaller schedulers in a second layer, and single smaller scheduler in the last layer.

Particular embodiments provide the possibility of spreading the scheduler across multiple devices. It is conceivable for example to have a multi-chip solution, in which partial scheduling is done on different chips, and even at different geographical locations, and combined later on.

Particular embodiments achieve traffic pattern that statistically approximate the traffic distribution of the results of using a single conventional scheduler.

Particular embodiments enable more input channels and/or more traffic (more packets per second) to be transmitted.

Finally, particular embodiments have the advantage that they may remain transparent to an end user. In particular embodiments, there is no need for any impact on the data path.

Figure 6:
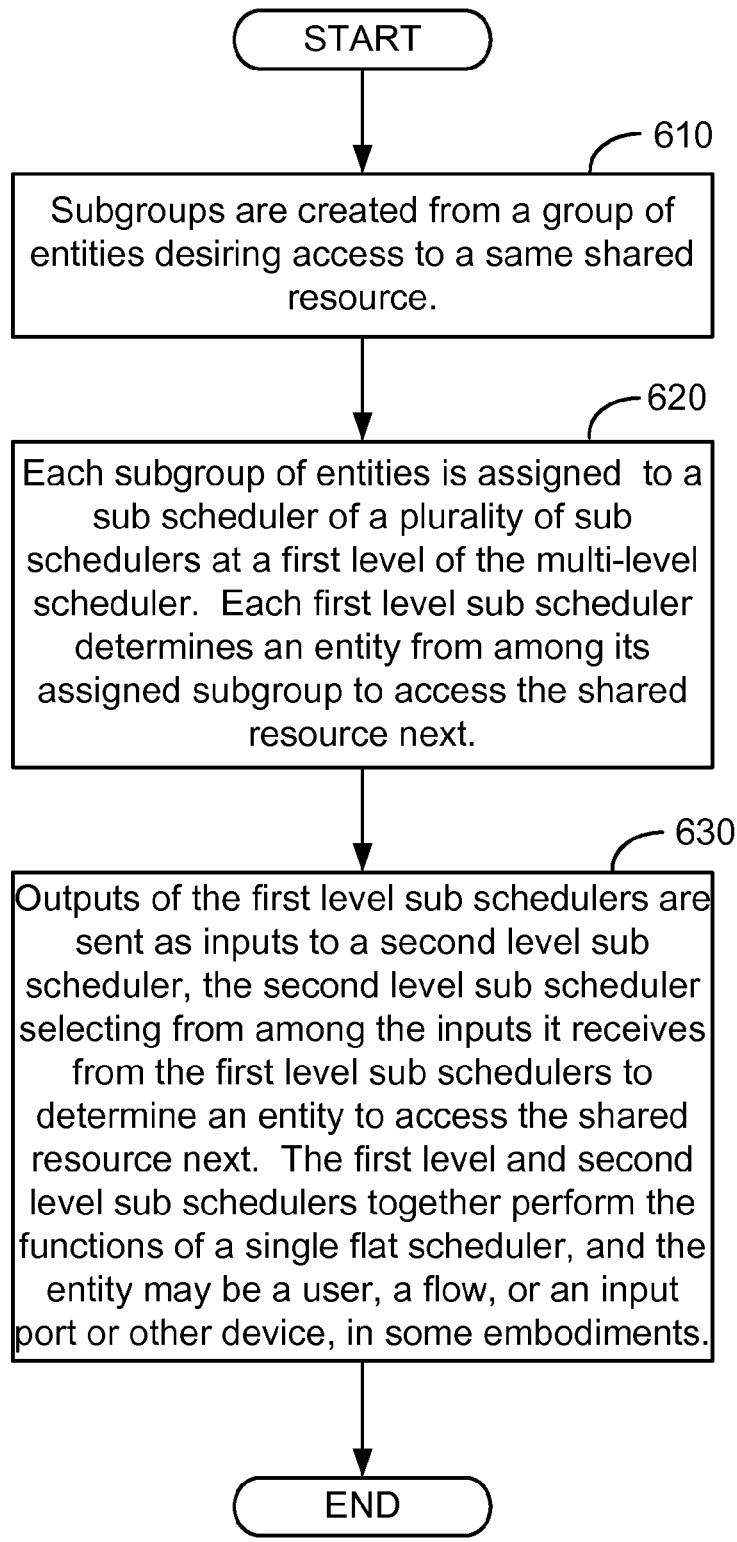
FIG. 6 illustrates an example method for deficit round robin scheduling in a high-speed switching environment using a multi-level Deficit Weighted Round Robin scheduler according to one embodiment of the present application.

Referring to FIG. 6, a simplified flow diagram showing a process for scheduling in a high-speed switching environment using a multi-level hierarchical scheduler, according to one embodiment of the present application is shown. The process uses a plurality of smaller schedulers to create a multi-level scheduler, the plurality of smaller schedulers together performing the functions of a single flat scheduler.

In 610, subgroups are created from a group of entities desiring access to a same shared resource.

In 620, each subgroup of entities is assigned to a sub scheduler of a plurality of sub schedulers at a first level of the multi-level scheduler. And each first level sub scheduler determines an entity from among its assigned subgroup to access the shared resource next.

In 630, outputs of the first level sub schedulers are sent as inputs to a second level sub scheduler, the second level sub scheduler selecting from among the inputs it receives from the first level sub schedulers to determine an entity to access the shared resource next.

The first level and second level sub schedulers together perform the functions of a single flat scheduler.

The entity may be a user, a flow, or an input port or other device, in some embodiments.

Among other things, this invention relates to communication systems and more particularly to deficit round-robin scheduling in a high-speed switching environment. High-speed interconnects have become more common in communications networks, and, as a result, the efficient scheduling of data traffic becomes increasingly important. Scheduling mechanisms in conventional switches cannot provide the scalability and switching speed typically needed to support these interconnects.

The above-described embodiments are not meant to limit the scope of the present disclosure. On the contrary, the disclosure is intended to cover alternatives, modifications, and equivalents as may be included within the spirit and scope of the disclosure.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A method of scheduling that uses a multi-level scheduler comprising a plurality of sub schedulers arranged in a hierarchy, the method comprising:
   creating subgroups from a group of entities desiring access to a shared resource;
   assigning each subgroup of entities from the group of entities to a sub scheduler of the plurality of sub schedulers at a first level of the multi-level scheduler,
   wherein each first level sub scheduler from the plurality of sub schedulers determines a first level result entity from among its assigned subgroup to access the shared resource; and
   sending outputs of the first level sub schedulers as inputs to a second level sub scheduler, the second level sub scheduler selecting from among the inputs it receives from the first level sub schedulers to determine a second level result entity to access the shared resource, wherein selecting among the inputs includes:
      monitoring a volume of traffic associated with each of the entities from the group of entities assigned to the plurality of sub schedulers at the first level of the multi-level scheduler;
      calculating weights to assign to each input of the second level sub scheduler based at least in part on the monitored traffic load associated with each entity from the group of entities assigned to the plurality of sub schedulers at the first level of the multi-level scheduler;
      selecting the input to the second level scheduler to be provided access to the shared resource based on the weights assigned to each input of the second level sub scheduler;
      providing an indication to a First-In First-Out (FIFO) associated with one of the first level sub schedulers to provide a first packet to be provided to the second level sub scheduler;
      providing the first packet to the shared resource;
      providing an indication of a capacity of the FIFO to the first level sub scheduler associated with the FIFO following the providing of the first packet to the second level sub scheduler; and
      storing a second packet received from the first level sub scheduler associated with the FIFO in the FIFO based on the indication of the capacity of the FIFO.

2. The method of claim 1, wherein the multi-level scheduler achieves the same scheduling results of a single flat scheduler.

3. The method of claim 1, wherein the multi-level scheduler performs scheduling in part using a deficit weighted round robin scheme.

4. The method of claim 1, wherein said each subgroup of entities is assigned an allocation of bandwidth of the shared resource and said allocations are based at least in part on a measured traffic load associated with each entity from the group of entities, and where the scheduling performed by the multi-level scheduler is based at least in part on said assigned allocations.

5. The method of claim 1, wherein the shared resource is an output port of a switch, and the entities are a group of input ports of the same switch.

6. The method of claim 5, wherein the weights assigned to each of the group of input ports is determined at least in part by the volume of traffic at each input port of the group of input ports.

7. The method of claim 5, wherein the multi-level scheduler determines which input port is permitted to next transmit a packet to the output port.

8. The method of claim 1, wherein the second level sub scheduler is one of a plurality of second level sub schedulers, and the outputs of the plurality of second level sub schedulers are sent as inputs to a third level sub scheduler, and wherein the first, second and third level of sub schedulers together perform functions of a single flat scheduler.

9. A multi-level scheduler, implemented using a plurality of sub schedulers, the plurality of sub schedulers together performing functions of a single conventional scheduler, the multi-level scheduler comprising:
   one or more first level sub schedulers from the plurality of sub schedulers;
   one or more second level sub schedulers from the plurality of sub schedulers;
   memory; and
   a processor configured to:
   create subgroups from a group of entities desiring access to a shared resource;
   assign each subgroup of entities from the group of entities to a sub scheduler of the plurality of sub schedulers at the first level of the multi-level scheduler,
   wherein each first level sub scheduler from the plurality of sub schedulers determines a first level result entity from among its assigned subgroup to access the shared resource;
   send outputs of the first level sub schedulers as inputs to a second level sub scheduler, the second level sub scheduler selecting from among the inputs it receives from the first level sub schedulers to determine a second level result entity to access the shared resource, wherein selecting among the inputs includes:
      monitoring a volume of traffic associated with each of the entities from the group of entities assigned to the plurality of sub schedulers at the first level of the multi-level scheduler;
      calculating weights to assign to each input of the second level sub scheduler based at least in part on the monitored traffic load associated with each entity from the group of entities assigned to the plurality of sub schedulers at the first level of the multi-level scheduler;

selecting the input to the second level scheduler to be provided access to the shared resource based on the weights assigned to each input of the second level sub scheduler;

providing an indication to a First-In First-Out (FIFO) associated with one of the first level sub schedulers to provide a first packet to be provided to the second level sub scheduler;

providing the first packet to the shared resource;

providing an indication of a capacity of the FIFO to the first level sub scheduler associated with the FIFO following the providing of the first packet to the second level sub scheduler; and storing a second packet received from the first level sub scheduler associated with the FIFO in the FIFO based on the indication of the capacity of the FIFO.

10. The multi-level scheduler of claim 9, wherein the multi-level scheduler achieves the same scheduling results of a single flat scheduler.

11. The multi-level scheduler of claim 9, wherein scheduling is performed using a deficit weighted round robin scheme.

12. The multi-level scheduler of claim 9, wherein said each subgroup of entities is assigned an allocation of bandwidth of the shared resource and said allocations are based at least in part on a measured traffic load associated with each entity from the group of entities, and where the scheduling performed by the multi-level scheduler is based at least in part on said assigned allocations.

13. The multi-level scheduler of claim 9, wherein the shared resource is an output port of a switch, and the entities are a group of input ports of the same switch.

14. The multi-level scheduler of claim 13, wherein the weights assigned to each of the group of input ports is determined at least in part by the volume of traffic at each input port of the group of input ports.

15. The multi-level scheduler of claim 13, wherein the multi-level scheduler determines which input port or input flow is permitted to next transmit a packet to the output port.

16. The multi-level scheduler of claim 9, wherein the second level sub scheduler is one of a plurality of second level sub schedulers, and the outputs of the plurality of second level sub schedulers are sent as inputs to a third level sub scheduler, and wherein the first, second and third level of sub schedulers together perform functions of a single flat scheduler.

17. At least one non-transitory computer readable storage medium having computer program instructions stored thereon that are arranged to perform the following operations in connection with implementing a multi-level scheduler:

creating subgroups from a group of entities desiring access to a shared resource;

assigning each subgroup of entities from the group of entities to a sub scheduler of the plurality of sub schedulers at a first level of the multi-level scheduler, wherein each first level sub scheduler from the plurality of sub schedulers determines a first level result entity from among its assigned subgroup to access the shared resource; and sending outputs of the first level sub schedulers as inputs to a second level sub scheduler, the second level sub scheduler selecting from among the inputs it receives from the first level sub schedulers to determine a second level result entity to access the shared resource, wherein selecting among the inputs includes:

monitoring a volume of traffic associated with each of the entities from the group of entities assigned to the plurality of sub schedulers at the first level of the multi-level scheduler;

calculating weights to assign to each input of the second level sub scheduler based at least in part on the monitored traffic load associated with each entity from the group of entities assigned to the plurality of sub schedulers at the first level of the multi-level scheduler; and selecting the input to the second level scheduler to be provided access to the shared resource based on the weights assigned to each input of the second level sub scheduler;

providing an indication to a First-In First-Out (FIFO) associated with one of the first level sub schedulers to provide a first packet to be provided to the second level sub scheduler;

providing the first packet to the shared resource;

providing an indication of a capacity of the FIFO to the first level sub scheduler associated with the FIFO following the providing of the first packet to the second level sub scheduler; and storing a second packet received from the first level sub scheduler associated with the FIFO in the FIFO based on the indication of the capacity of the FIFO.

\* \* \* \* \*